United States Patent
Eckelberry et al.

(12)

(10) Patent No.: US 6,619,673 B2
(45) Date of Patent: Sep. 16, 2003

(54) MECHANISM FOR FIXING THE HEIGHT OF THE TRAILER FLOOR AT A PLURALITY OF LEVELS BY FIXING THE ANGULAR POSITION OF A PIVOTING SUSPENSION COMPONENT

(75) Inventors: James Eckelberry, Canton, OH (US); John K. Ma, Rochester, MI (US); Frank A. Maly, Jr., Beverly Hills, MI (US); Joseph Melekian, Rochester Hills, MI (US); Steven R. Miller, Clarkston, MI (US); Nancy L. Saxon, Oakland Township, MI (US); Rajesh J. Somnay, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 55 days.

(21) Appl. No.: 09/810,923

(22) Filed: Mar. 16, 2001

(65) Prior Publication Data

US 2002/0130479 A1 Sep. 19, 2002

(51) Int. Cl.$^7$ .................................................. B60S 9/00
(52) U.S. Cl. ............................ 280/6.151; 280/124.153; 280/754; 280/764.1; 180/290
(58) Field of Search ...................... 280/124.109, 124.11, 280/124.116, 124.153, 781, 789, 6.151, 763.1, 764.1, 475, 754; 180/290

(56) References Cited

U.S. PATENT DOCUMENTS

| | | | | |
|---|---|---|---|---|
| 2,616,713 A | * | 11/1952 | Schofield | 280/6.151 |
| 3,743,044 A | * | 7/1973 | Scheele | 180/22 |
| 3,844,582 A | * | 10/1974 | Cook | 280/764.1 |
| 3,874,696 A | * | 4/1975 | Gardner et al. | 248/188.6 |
| 3,950,007 A | * | 4/1976 | Berger | 180/24.02 |
| 3,953,040 A | * | 4/1976 | Unruh et al. | 280/124.112 |
| 4,262,929 A | * | 4/1981 | Pierce | 280/124.108 |
| 4,344,643 A | * | 8/1982 | Ray | 280/124.109 |
| 4,453,737 A | * | 6/1984 | Burchard et al. | 267/251 |
| 4,536,009 A | * | 8/1985 | Ashworth | 212/304 |
| RE32,736 E | * | 8/1988 | Lovell | |
| 4,802,690 A | * | 2/1989 | Raidel | 280/124.157 |
| 5,016,912 A | * | 5/1991 | Smith et al. | 280/124.132 |
| 5,040,826 A | * | 8/1991 | Lovell | 280/149.2 |
| 5,050,845 A | * | 9/1991 | Aline et al. | 254/419 |
| 5,217,209 A | * | 6/1993 | Anders | 254/419 |
| 5,863,049 A | * | 1/1999 | Mahvi | 280/414.5 |
| 5,924,712 A | * | 7/1999 | Pierce | 280/124.13 |
| 6,050,573 A | * | 4/2000 | Kunz | 254/45 |
| 6,152,486 A | * | 11/2000 | Pierce | 280/755 |
| 6,257,597 B1 | * | 7/2001 | Galazin | 280/6.151 |

* cited by examiner

Primary Examiner—Paul N. Dickson
Assistant Examiner—Deanna Draper
(74) Attorney, Agent, or Firm—Carlson, Gaskey & Olds

(57) ABSTRACT

A mechanism is disclosed for controlling the vertical position of the transport trailer floor of a heavy trailer bearing vehicle having a pivoting air spring suspension system such that the transport trailer floor maintains a fixed position level to an adjacent dock platform when parked for loading or unloading. The mechanism comprises various embodiments of a locking system that disables the pivotal movement of selected pivoting suspension elements in any one of a plurality of possible fixed positions such that the transport trailer floor, when parked, resists downwardly imposed forces and maintains a fixed elevation equal to the elevation of an adjacent loading dock platform.

5 Claims, 2 Drawing Sheets

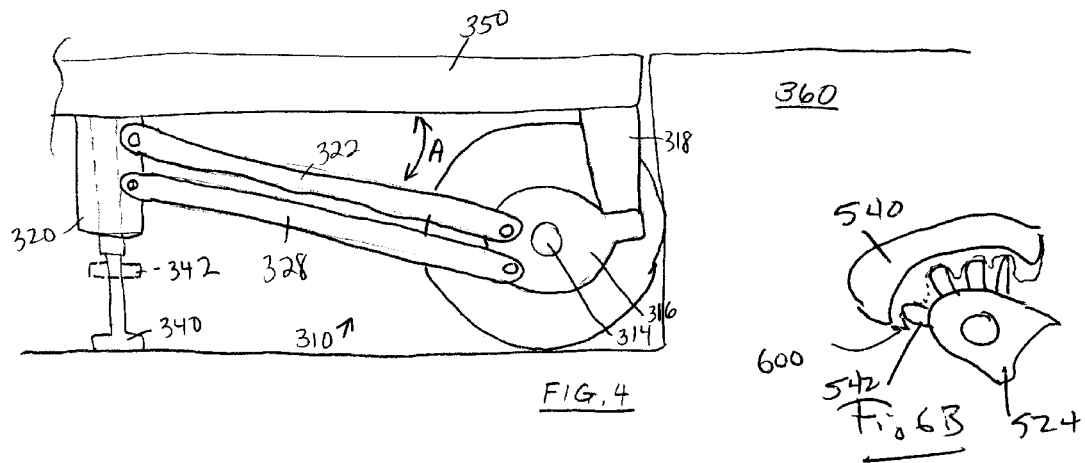
FIG. 4
FIG. 6B
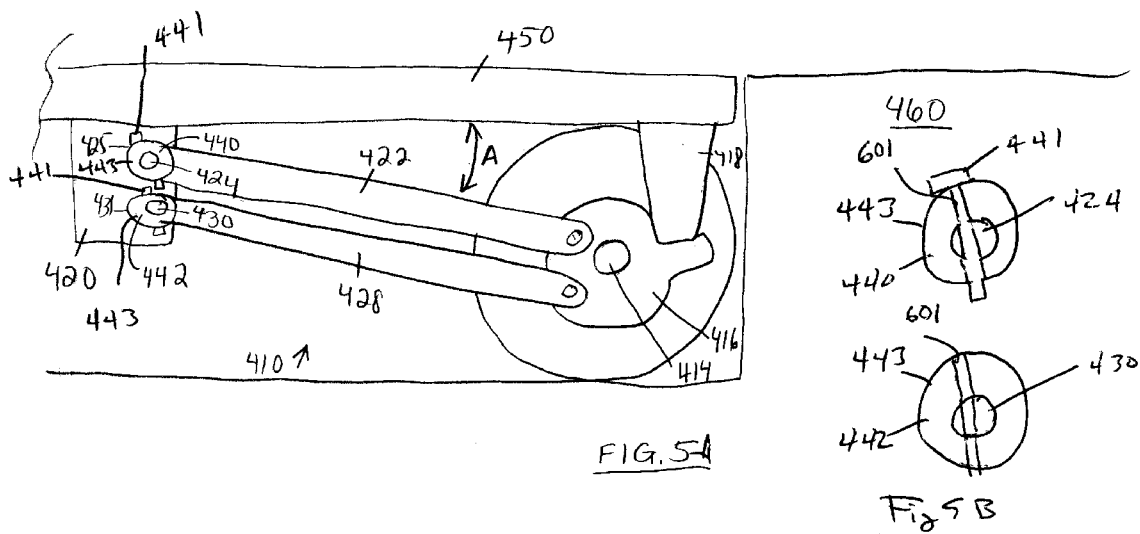
FIG. 5A
FIG. 5B
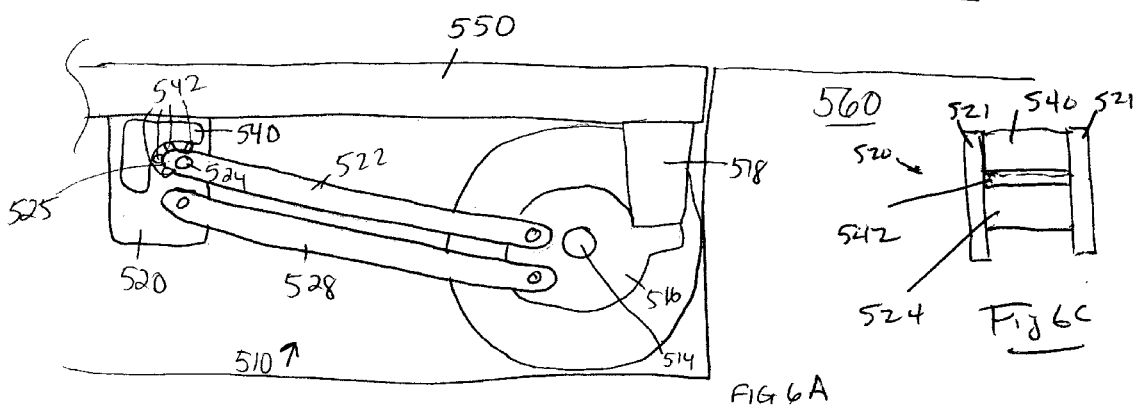
FIG. 6A
FIG. 6C

MECHANISM FOR FIXING THE HEIGHT OF THE TRAILER FLOOR AT A PLURALITY OF LEVELS BY FIXING THE ANGULAR POSITION OF A PIVOTING SUSPENSION COMPONENT

BACKGROUND OF THE INVENTION

This invention relates to a mechanism for controlling the vertical position of a trailer floor having a pivoting air spring suspension system such that the trailer floor maintains a relatively fixed vertical position level to an adjacent dock when parked for loading or unloading.

During the transport of goods by heavy tractor/trailer vehicles it is necessary for the trailer to maintain a relatively smooth and uniform position during travel over uneven road surfaces. This is generally accomplished by the incorporation of an air ride suspension system that allows for a range of movement between the trailer and the rotating wheels such that the trailer may be protected from a degree of shock imparted to the rotating wheels that are directly exposed to the road surface.

An air ride suspension system typically utilizes a pivoting air spring system to connect the wheels to the trailer. A wheel axle is contained along its length by an axle housing which is attached to the trailer floor at an area above the axle housing by way of an air spring system. The axle housing further is pivotally attached to a frame bracket extending downward from the trailer floor, typically by way of a pair of parallel elongate upper and lower control arms. The angular position of the pivotally attached control arms varies with respect to the generally horizontal trailer floor during transport of the trailer.

While the pivoting spring system reduces the degree of shock imparted to the trailer during transport, it serves as a hindrance when the trailer is parked at a dock during loading and unloading of goods as the pivoting air spring suspension system is unable to maintain a desired trailer floor height. When parked at a dock, the trailer floor height will fluctuate up and down as a lift truck drives on or off the trailer causing load force changes into the suspension system.

A height control system cannot react efficiently enough to add or exhaust air from the air springs to maintain a constant trailer floor height. This would result in a variable dock board ramp angle. At worst, a trailer may be parked having a depleted air reserve thus leaving the suspension system in the full jounce position. This would, in some cases, cause ramp angles steep enough such that the lift truck cannot negotiate the dock board on or off of the trailer.

It would be desirable to provide the trailer with a mechanism that allows the pivoting components of the pivoting air spring suspension system to be locked or fixed at variable levels so that when parked, the trailer floor may be at a desired elevation as the adjacent loading dock surface during loading or unloading of goods. Thus, a variable dock board ramp angle would be eliminated, as the suspension system would not be in a position to fluctuate in response to varying lift truck loads.

SUMMARY OF THE INVENTION

In a series of disclosed embodiments of this invention, a trailer is optimally positioned at an adjacent loading dock by way of an air height control system such that respective adjacent floor surfaces are held at a desirable elevation level and the trailer parking brakes are then set. With this accomplished, an inventive mechanism is introduced that can incrementally fix or lock the angular position of the pivoting components of the pivoting air spring suspension system thereby fixing the trailer floor elevation while parked at an adjacent loading dock.

In a first embodiment of the inventive locking mechanism, the pivoting suspension system components, which may comprise a pair of parallel elongate upper and lower control arms extending from the wheel axle housing to the trailer floor frame bracket, are provided with an adjustable length diagonal support that is pivotally attached at one end to the trailer floor frame bracket. The distal end of the adjustable length diagonal support may then be fixed into one of a plurality of locking positions by way of a stop device positioned on the wheel axle housing that has a plurality of incrementally spaced fixed rest surfaces.

In a second embodiment of the inventive locking mechanism, the pivoting suspension system components are provided with an elongate diagonal support arm pivotally attached at one end to the trailer floor frame bracket. The distal end of the diagonal support arm has a cam profile that is configured to make contact with and rest against the wheel axle in a plurality of rest positions thus fixing the angular rotation of the pivoting suspension system components.

In a third embodiment of the inventive locking mechanism, hydraulically activated telescoping stands are provided. These stands extend downward from the trailer floor to the ground in a plurality of stop positions such that the angular rotation of the pivoting suspension components may be resisted.

In a fourth embodiment of the inventive locking mechanism, the pivoting suspension components are provided with activated locking collars at each pivotal connection to the trailer floor frame bracket. The locking collars enable a plurality of stop positions thus fixing the angular rotation of the pivoting suspension components.

In a fifth embodiment of the inventive locking mechanism, piezo electric pads are positioned on a surface of the trailer floor frame bracket. The pivoting ends of the pivoting suspension components, or parallel upper and lower control arms, that are pivotally connected to the trailer floor frame bracket are provided with a plurality of small extensions. When energized, the piezo electric pads would trap and immobilize at least one extension thus fixing the angular rotation of the pivoting suspension components.

These and other features of the present invention can be understood from the following specification and drawings, the following of which is a brief description.

DETAILED DESCRIPTION OF THE DRAWINGS

Figure 1:
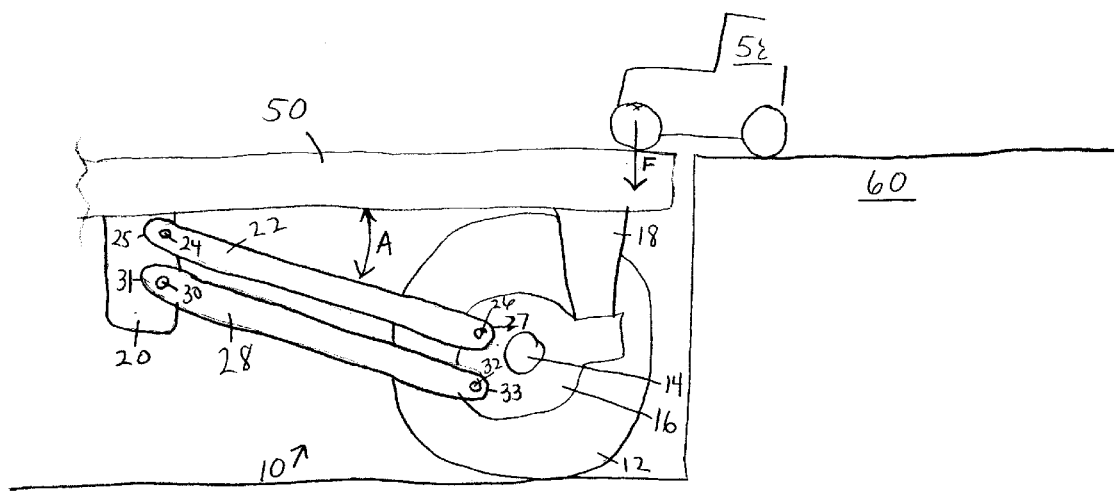
FIG. 1 is a schematic view of the prior art trailer suspension system and adjacent loading dock.

FIG. 1 schematically shows the prior art pivoting air spring suspension system 10 of a trailer floor 50 and adjacent loading dock 60. The following generally describes the configuration of pivoting air spring suspension system 10. Wheel 12 rotates on axle 14. Axle 14 is contained along its length by axle housing 16, which is attached to trailer floor 50 by way of air spring system 18. Axle housing 16 is further pivotally attached to frame bracket 20 extending downward from trailer floor 50 by way of a pair of parallel elongate upper and lower control arms, 22 and 28 respectively. Upper control arm 22 includes pivotal frame bracket connection 24 at a first end 25 and pivotal axle housing connection 26 at a second end 27. Lower control arm 28 includes pivotal frame bracket connection 30 at a first end 31 and pivotal axle housing connection 32 at a second end 33. This general description of the configuration of elements of the pivoting air spring suspension system 10 may also be assumed for the pivoting air spring suspension system as schematically shown in FIGS. 2 through 6.

The angular position of upper and lower control arms, 22 and 28, with respect to the generally horizontal trailer floor 50 results in a variable dock ramp angle A. Without the presence of a mechanism for maintaining dock ramp angle A as a constant during loading or unloading of goods, the introduction of a lift truck 58 to trailer floor 50 causes downwardly exerted force F which, in turn, results in a variable dock ramp angle A. This results in undesirable fluctuations of the elevation of trailer floor 50 with respect to the constant elevation of loading dock 60.

Figure 2A:
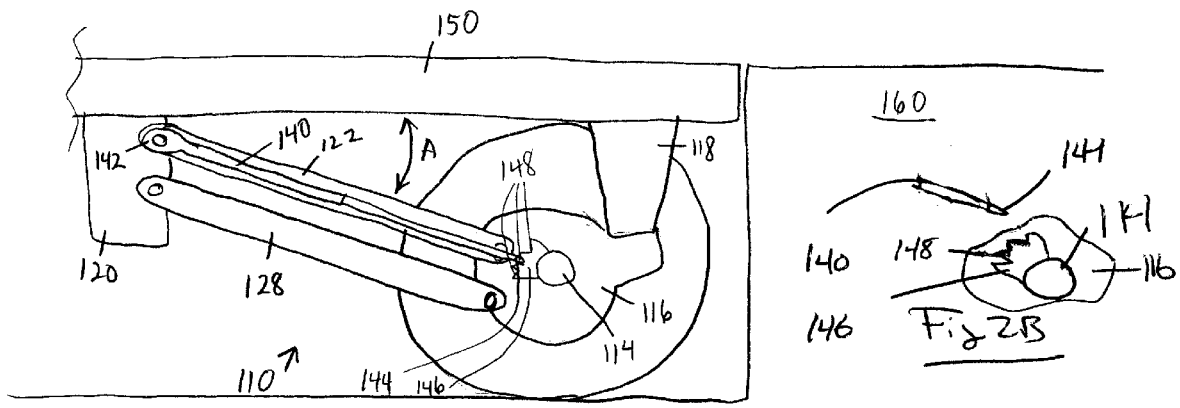
FIG. 2A is a schematic view of a first embodiment of the suspension system locking mechanism of the present invention.
Figure 2A:
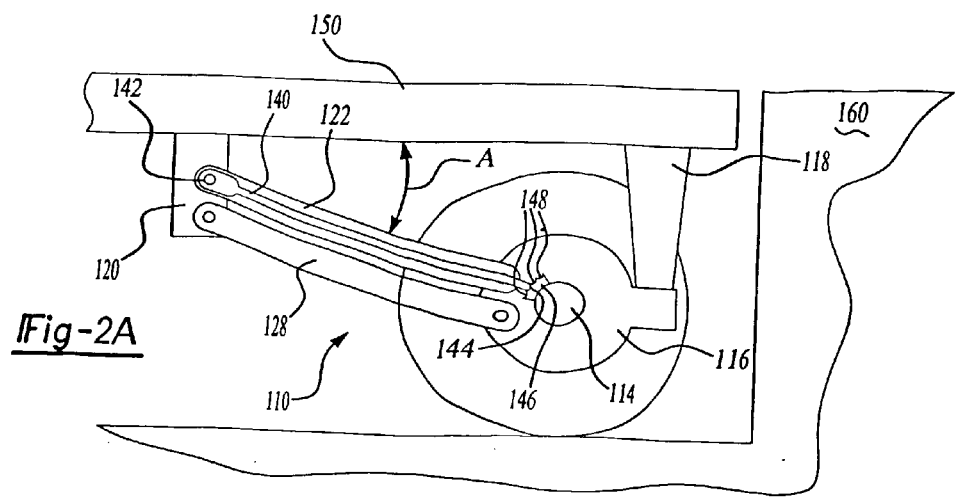
Figure 2B:
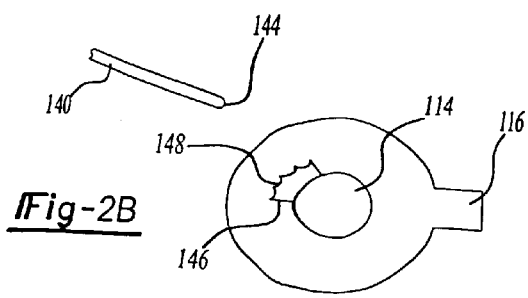
FIG. 2B shows a detail of the FIG. 2A embodiment.

FIGS. 2A and 2B schematically shows the incorporation of a first embodiment of the inventive locking mechanism to pivoting air spring suspension system 110. Generally, the pivoting air spring suspension system 110 includes wheel axle 114, axle housing 116, trailer floor 150, air spring system 118 and trailer frame bracket 120. Pivotally connected elements include parallel upper and lower control arms 122 and 128, respectively. The locking mechanism of this embodiment comprises an adjustable length diagonal support 140 that is pivotally attached at a first end 142 to trailer frame bracket 120. The distal end 144 of adjustable length diagonal support 140 may be fixed into one of a plurality of locking positions by way of stop device 146 positioned on axle housing 116 that has a plurality of fixed rest surfaces 148. Thus, dock ramp angle A may be maintained as a constant so that trailer floor 150 is held at a relatively fixed elevation while parked at adjacent loading dock 160.

Figure 3A:
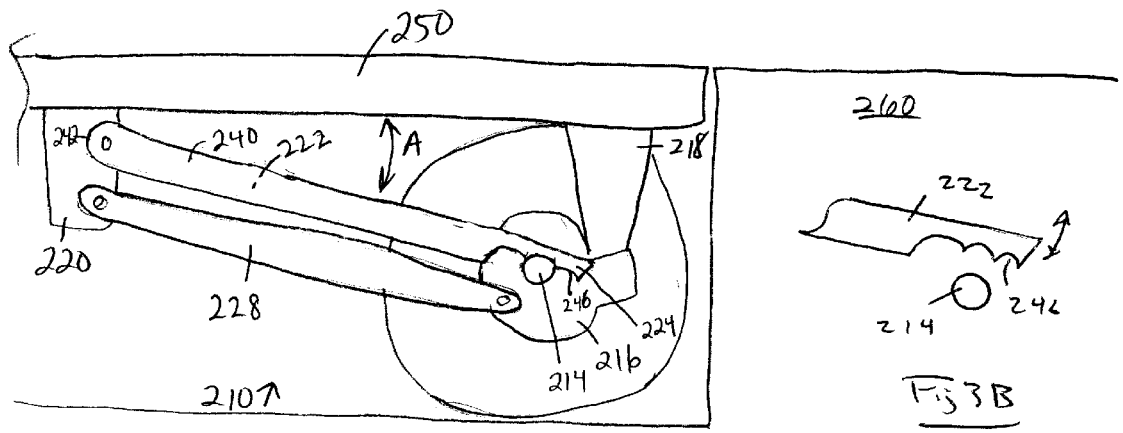
FIG. 3A is a schematic view of a second embodiment of the suspension system locking mechanism of the present invention.
Figure 1:
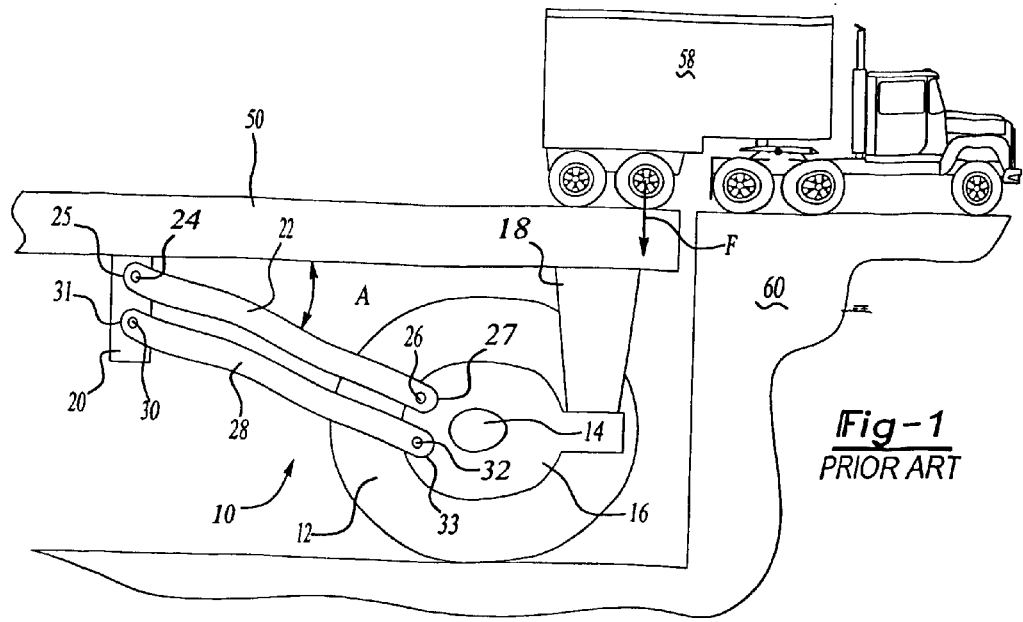
Figure 3A:
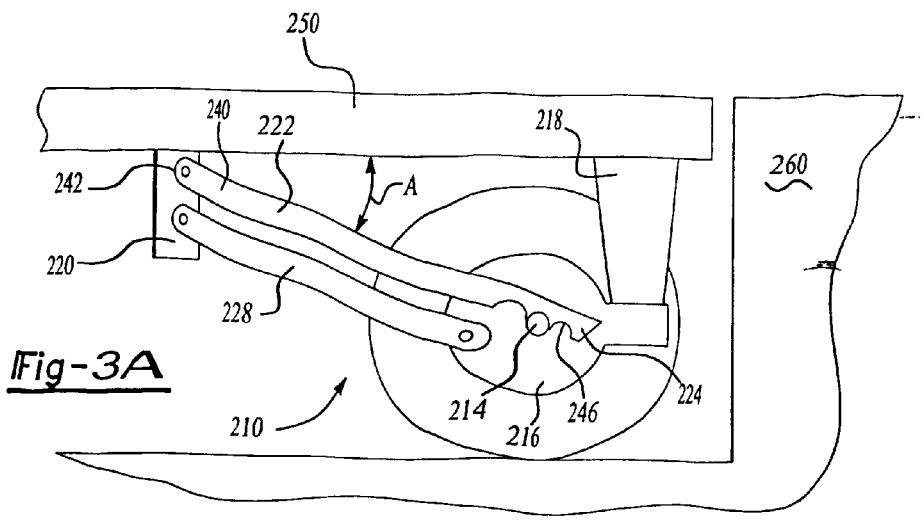
Figure 3B:
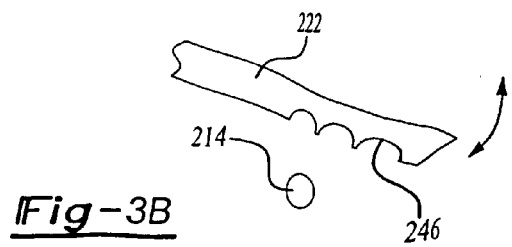
FIG. 3B shows a detail of the FIG. 3A embodiment.

FIGS. 3A and 3B schematically shows the incorporation of a second embodiment of the inventive locking mechanism to pivoting air spring suspension system 210. Generally, the pivoting air spring suspension system 210 includes wheel axle 214, axle housing 216, trailer floor 250, air spring system 218 and trailer frame bracket 220. Pivotally connected elements include parallel upper and lower control arms 222 and 228, respectively. The locking mechanism of this second embodiment comprises an elongate diagonal support arm 240 pivotally attached at a first end 242 to trailer frame bracket 220. The distal end 224 of diagonal support arm 240 has a cam edge profile 246 that is configured to make contact with and rest downwardly against wheel axle 214 in a plurality of rest positions, thus limiting and therefore fixing dock ramp angle A while trailer floor 250 is adjacent loading dock 260.

Figure 4:
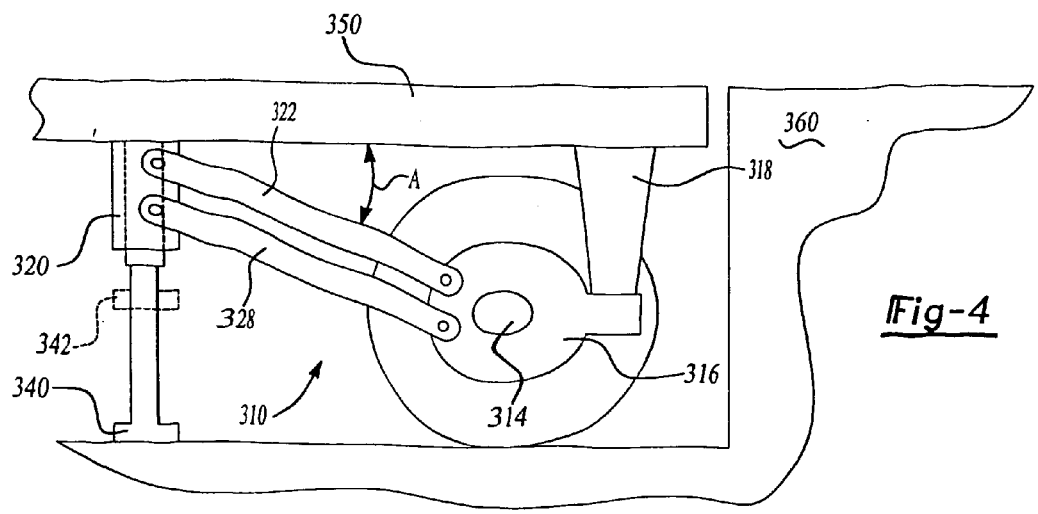
FIG. 4 is a schematic view of a third embodiment of the suspension system locking mechanism of the present invention.

FIG. 4 schematically shows the incorporation of a third embodiment of the inventive locking mechanism to pivoting air spring suspension system 310. Generally, the pivoting air spring suspension system 310 includes wheel axle 314, axle housing 316, trailer floor 350, air spring system 318 and trailer frame bracket 320. Pivotally connected elements include parallel upper and lower control arms 322 and 328, respectively. The locking mechanism of this third embodiment comprises the provision of a set of hydraulically actuated adjustable telescoping vertical stands, one of which is shown in an extended position at 340 and a retracted position at 342. Extended vertical stand 340 adjustably fixes the elevation of trailer floor 350 and thus fixes dock ramp angle A while trailer floor 350 maintains the desired elevation with respect to adjacent loading dock 360.

Figure 5A:
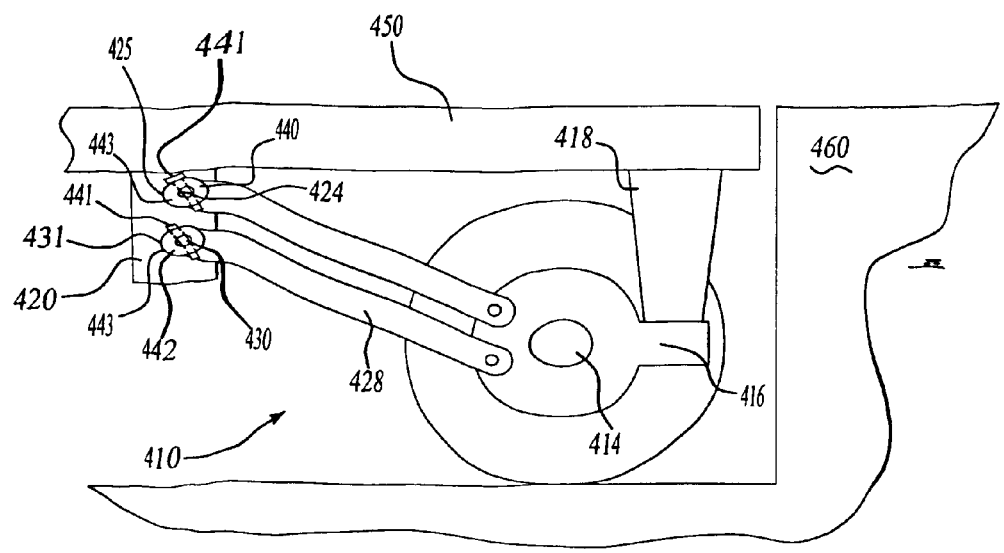
FIG. 5A is a schematic view of a fourth embodiment of the suspension system locking mechanism of the present invention.
Figure 5B:
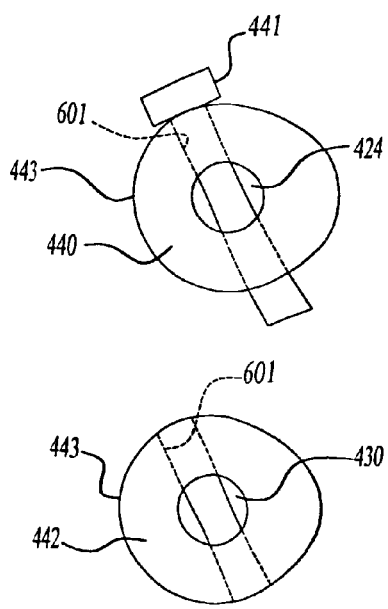
FIG. 5B shows a detail of the FIG. 5A embodiment.

FIGS. 5A and 5B schematically shows the incorporation of a fourth embodiment of the inventive locking mechanism to pivoting air spring suspension system 410. Generally, the pivoting air spring suspension system 410 includes wheel axle 414, axle housing 416, trailer floor 450, air spring system 418 and trailer frame bracket 420. Pivotally connected elements include parallel upper and lower control arms 422 and 428, respectively. Upper control arm 422 includes pivotal frame bracket connection 424 at a first end 425 and lower control arm 428 includes pivotal frame bracket connection 430 at a first end 431. The locking mechanism of this fourth embodiment comprises the provision of a set of locking collars 440, 442 positioned respectively at the upper control arm pivotal frame bracket connection 424 and the lower control arm pivotal frame bracket connection 430. Locking collars 440, 442 may be of a typical pin 441 and bushing 443 type and when activated, will limit the rotation of control arms 422, 428, thus fixing the dock ramp angle A while trailer floor 450 is adjacent loading dock 460. The pins 441 are inserted or removed to selectively fix the arms 422 and 428. The collars are shown in FIG. 5B in the locked position (collar 440) and the unlocked position (collar 442). The bushing 443 is typically fixed to the frame bracket. A single hole 601 is shown extending through both the bushing 443 and the pivot pin 424 and 430. In practice, the bushing 443 would preferably be formed with a plurality of incrementally spaced holes 601, such that there will be a hole set 601 through the bushing 443 relatively adjacent the position of the hole through the pin 424 or 430, such that the arms can be locked as described.

Figure 6A:
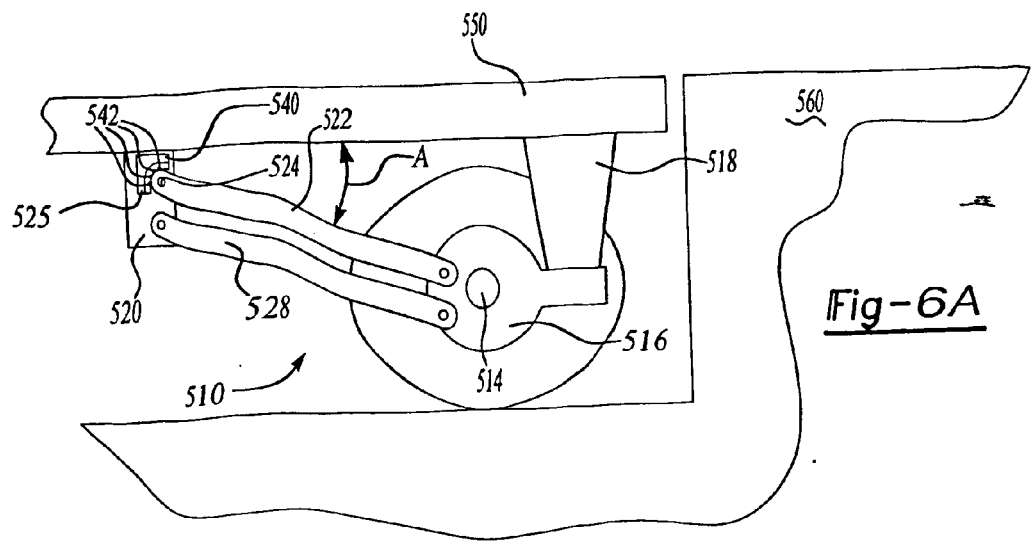
FIG. 6A is a schematic view of a fifth embodiment of the suspension system locking mechanism of the present invention.
Figure 6B:
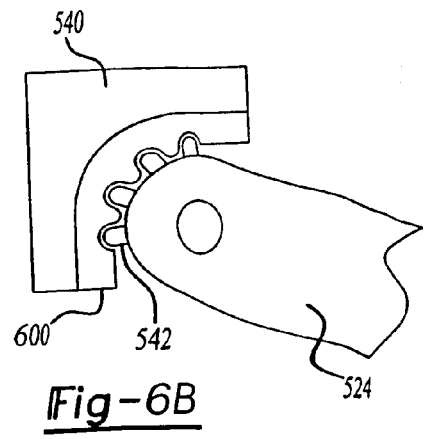
FIG. 6B shows a detail of the FIG. 6A embodiment.
Figure 6C:
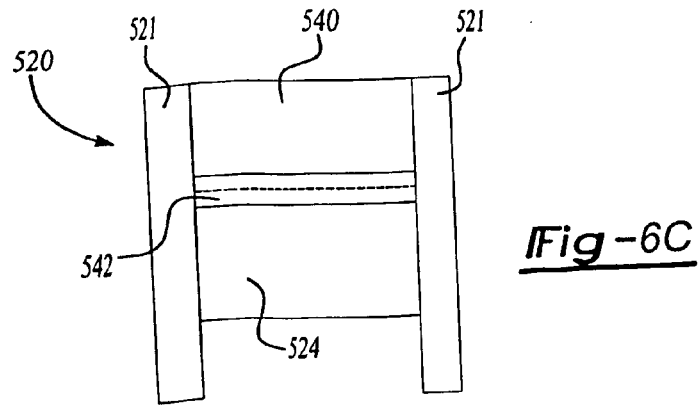
FIG. 6C shows another feature.

FIGS. 6A, 6B and 6C schematically shows the incorporation of a fifth embodiment of the inventive locking mechanism to pivoting air spring suspension system 510. Generally, the pivoting air spring suspension system 510 includes wheel axle 514, axle housing 516, trailer floor 550, air spring system 518 and trailer frame bracket 520. Bracket 520 has two spaced side walls 52 as shown in FIG. 6C. Pivotally connected elements include parallel upper and lower control arms 522 and 528, respectively. Upper control arm 522 includes pivotal frame bracket connection 524 at a first end 525. The locking mechanism of this fifth embodiment comprises the provision of a piezo electric pad system 540 positioned on the trailer frame bracket 520 and between walls 521. Upper control arm 522 has at its frame bracket connection end 525 a plurality of extensions 542. When energized, as shown in phantom at 600 in FIG. 6B, the piezo electric pad system 540 traps at least one extension 542 of upper control arm 522 thus fixing dock ramp angle A while trailer floor 550 is parked adjacent loading dock 560. As known when energized a piezo electric device expands as shown in FIG. 6B.

While a dual arm suspension arrangement is shown, the invention does extend to other suspension arrangements.

Preferred embodiments of this invention have been disclosed, however, a worker in this art would recognize that certain modifications would come within the scope of this invention. For that reason, the following claims should be studied to determine the true scope and content of this invention.

What is claimed is:

1. A pivoting air spring suspension system for a transport trailer comprising:

a transport trailer floor having at least one downwardly extending frame bracket;

at least one rotatable wheel on a rotatable wheel axle whereby said wheel axle is contained within a wheel axle housing that is connected to said transport trailer floor by way of an air spring system;

said frame bracket and said wheel axle housing being pivotally connected together by a suspension thus enabling a pivotal movement there between;

a locking mechanism for disabling said pivotal movement in any one of a plurality of fixed stop positions such that said transport trailer floor, when parked, resists downwardly imposed forces and maintains a relatively fixed elevation adjacent a loading dock platform;

said frame bracket and said wheel axle housing are pivotally connected together by way of a pair of parallel elongate upper and lower control arms, said upper control arm having a first end pivotally connected to said frame bracket and a second distal end pivotally connected to said wheel axle housing, and said lower control arm having a first end pivotally connected to said frame bracket and a second distal end pivotally connected to said wheel axle housing, said parallel upper and lower control arms and said transport trailer floor forming a variable dock ramp angle there between, whereby said locking mechanism, when activated, maintains said dock ramp angle at a single fixed limit; and said locking mechanism comprises a piezo electric pad system positioned on said frame bracket that, when energized, fixedly traps at least one of a plurality of extensions positioned on said first end of said upper control arm.

2. A pivoting air spring suspension system for a transport trailer as recited in claim 1, wherein said locking mechanism locks said suspension against movement.

3. A pivoting air spring suspension system for a transport trailer comprising:

a transport trailer floor having at least one downwardly extending frame bracket;

at least one rotatable wheel on a rotatable wheel axle whereby said wheel axle is contained within a wheel axle housing that is connected to said transport trailer floor by way of an air spring system;

said frame bracket and said wheel axle housing being pivotally connected together by a suspension thus enabling a pivotal movement there between;

a locking mechanism for disabling said pivotal movement in any one of a plurality of fixed stop positions such that said transport trailer floor, when parked, resists downwardly imposed forces and maintains a relatively fixed elevation adjacent a loading dock platform;

said frame bracket and said wheel axle housing are pivotally connected together by way of a pair of parallel elongate upper and lower control arms, said upper control arm having a first end pivotally connected to said frame bracket and a second distal end pivotally connected to said wheel axle housing, and said lower control arm having a first end pivotally connected to said frame bracket and a second distal end pivotally connected to said wheel axle housing, said parallel upper and lower control arms and said transport trailer floor forming a variable dock ramp angle there between, whereby said locking mechanism, when activated, maintains said dock ramp angle at a single fixed limit; and said locking mechanism comprises an adjustable length diagonal support pivotally connected at a first end to said frame bracket and having a distal end which may be fixed into one of a plurality of locking positions on a stop device positioned on said wheel axle housing.

4. A pivoting air spring suspension system for a transport trailer comprising:

a transport trailer floor having at least one downwardly extending frame bracket;

at least one rotatable wheel on a rotatable wheel axle whereby said wheel axle is contained within a wheel axle housing that is connected to said transport trailer floor by way of an air spring system;

said frame bracket and said wheel axle housing being pivotally connected together by a suspension thus enabling a pivotal movement there between;

a locking mechanism for disabling said pivotal movement in any one of a plurality of fixed stop positions such that said transport trailer floor, when parked, resists downwardly imposed forces and maintains a relatively fixed elevation adjacent a loading dock platform;

said frame bracket and said wheel axle housing are pivotally connected together by way of a pair of parallel elongate upper and lower control arms, said upper control arm having a first end pivotally connected to said frame bracket and a second distal end pivotally connected to said wheel axle housing, and said lower control arm having a first end pivotally connected to said frame bracket and a second distal end pivotally connected to said wheel axle housing, said parallel upper and lower control arms and said transport trailer floor forming a variable dock ramp angle there between, whereby said locking mechanism, when activated, maintains said dock ramp angle at a single fixed limit; and said locking mechanism comprises at least one hydraulically activated telescoping stand that, when activated, extends downward from said transport trailer floor to an area of ground beneath said transport trailer floor at one of a plurality of stop positions.

5. A pivoting air spring suspension system for a transport trailer comprising:

a transport trailer floor having at least one downwardly extending frame bracket;

at least one rotatable wheel on a rotatable wheel axle whereby said wheel axle is contained within a wheel axle housing that is connected to said transport trailer floor by way of an air spring system;

said frame bracket and said wheel axle housing being pivotally connected together by a suspension thus enabling a pivotal movement there between;

a locking mechanism for disabling said pivotal movement in any one of a plurality of fixed stop positions such that said transport trailer floor, when parked, resists downwardly imposed forces and maintains a relatively fixed elevation adjacent a loading dock platform;

said frame bracket and said wheel axle housing are pivotally connected together by way of a pair of parallel elongate upper and lower control arms, said upper control arm having a first end pivotally connected to said frame bracket and a second distal end pivotally connected to said wheel axle housing, and said lower control arm having a first end pivotally connected to said frame bracket and a second distal end pivotally connected to said wheel axle housing, said parallel upper and lower control arms and said transport trailer floor forming a variable dock ramp angle there between, whereby said locking mechanism, when activated, maintains said dock ramp angle at a single fixed limit; and said locking mechanism comprises at least one locking collar positioned at said pivotally connected first end of one of said upper and lower control arms to fix the pivotal movement of said pivotally connected ends to one of a plurality of stop positions.

* * * * *

UNITED STATES PATENT AND TRADEMARK OFFICE
CERTIFICATE OF CORRECTION

PATENT NO.    : 6,619,673 B2
DATED         : September 16, 2003
INVENTOR(S)   : Eckelberry et al.

It is certified that error appears in the above-identified patent and that said Letters Patent is hereby corrected as shown below:

Please replace the informal drawings with the attached formal drawings that were submitted on March 16, 2001

Signed and Sealed this

Twenty-fourth Day of August, 2004

JON W. DUDAS
*Director of the United States Patent and Trademark Office*